(12) United States Patent
Du et al.

(10) Patent No.: US 12,146,104 B1
(45) Date of Patent: Nov. 19, 2024

(54) CO2 RESPONSIVE CORE-SHELL MULTI-STAGE SWELLING MICROSPHERE AND PREPARATION METHOD THEREOF

(71) Applicant: SOUTHWEST PETROLEUM UNIVERSITY, Chengdu (CN)

(72) Inventors: Daijun Du, Chengdu (CN); Zezhou Fang, Chengdu (CN); Wanfen Pu, Chengdu (CN); Jinzhou Zhao, Chengdu (CN); Yangyang Zhang, Chengdu (CN); Fayang Jin, Chengdu (CN); Rui Liu, Chengdu (CN); Peiwen Xiao, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/751,246

(22) Filed: Jun. 22, 2024

(30) Foreign Application Priority Data

Apr. 23, 2024 (CN) .......................... 202410490962.3

(51) Int. Cl.
| | |
|---|---|
| *C09K 8/588* | (2006.01) |
| *B01J 13/18* | (2006.01) |
| *B01J 13/22* | (2006.01) |
| *C08F 257/02* | (2006.01) |
| *C09K 8/594* | (2006.01) |

(52) U.S. Cl.
CPC .............. *C09K 8/588* (2013.01); *B01J 13/18* (2013.01); *B01J 13/22* (2013.01); *C08F 257/02* (2013.01); *C09K 8/594* (2013.01); *C08F 2810/20* (2013.01); *C08F 2810/50* (2013.01)

(58) Field of Classification Search
None
See application file for complete search history.

(56) References Cited

U.S. PATENT DOCUMENTS

| | | | |
|---|---|---|---|
| 10,836,957 B2 * | 11/2020 | Pangilinan | ............ C08F 220/56 |
| 11,987,749 B2 * | 5/2024 | Zhu | ....................... C08F 220/06 |
| 2009/0264321 A1 * | 10/2009 | Showalter | .............. C09K 8/516 |
| | | | 507/219 |
| 2020/0377787 A1 * | 12/2020 | Zhu | ....................... C08F 212/20 |

* cited by examiner

*Primary Examiner* — John J Figueroa
(74) *Attorney, Agent, or Firm* — Birchwood IP

(57) ABSTRACT

The present invention discloses a CO2 responsive core-shell multi-stage swelling microsphere and a preparation method thereof. The preparation method comprises the following steps: adding a styrene monomer into a sodium dodecyl sulfate solution for emulsion polymerization to obtain a spherical polystyrene solution, taking azobisisobutyronitrile and ethylene glycol for Pinner reaction to obtain an azo compound with hydroxyl functional groups at two ends, taking the azo compound with the hydroxyl functional groups at two ends as a raw material for Schotten-Baumann reaction with methacryloyl chloride to obtain BPAB, adding the BPAB into the spherical polystyrene solution to prepare an active polystyrene core solution, and dissolving the active polystyrene core solution, acrylamide, a CO2 responsive monomer, a CO2 responsive cross-linking agent and a stable cross-linking agent into water to obtain a target product. The CO2 responsive core-shell multi-stage swelling microsphere of the present invention can remarkably improve the CO2 flooding sweep efficiency.

5 Claims, 6 Drawing Sheets

CO2 RESPONSIVE CORE-SHELL MULTI-STAGE SWELLING MICROSPHERE AND PREPARATION METHOD THEREOF

CROSS-REFERENCE TO RELATED APPLICATIONS

This application claims priority to Chinese Patent Application No. 202410490962.3, filed on Apr. 23, 2024, which is hereby incorporated by reference in its entirety.

TECHNICAL FIELD

The present invention relates to the technical field of oilfield chemistry, and particularly relates to a CO2 responsive core-shell multi-stage swelling microsphere and a preparation method thereof.

BACKGROUND

Tight oil is an important force to replace conventional crude oil resources and support oil and gas revolution, which is widely distributed in Ordos Basin, Sichuan Basin, Junggar Basin, Songliao Basin, and Bohai Bay Basin in China. The tight oil has the geological resource amount of about 12.5 billion tons, ranking third in the world. However, the recovery ratio of tight oil based on natural energy exploitation is less than 5%. CO2 flooding is an important means to improve the recovery ratio of tight oil reservoirs and is an indispensable part of CCUS technology. However, the reservoir fractures are complex and have prominent heterogeneity, and low-viscosity CO2 easily flows along the fractures, resulting in low sweep efficiency.

As a CO2 flooding and channeling prevention system, the conventional gel particles usually reach swelling equilibrium in a short time, namely a single-stage swelling mode. The particles are easily dehydrated in a CO2 atmosphere, and the plugging strength of the channeling path is reduced. The CO2 responsive gel particles can make full use of the medium performance of CO2, and change the channeling prevention of conventional gel particles from "passive resistance" to "active adaptation". For example, the CO2 responsive groups on polymer chains and CO2 are subjected to a protonation reaction to generate amidine bicarbonate, zwitterion adducts or ammonium carbamate, the hydrophilicity of the particles is enhanced, and two-stage swelling occurs; or carbonated water formed by dissolving CO2 in formation water induces the acid-sensitive unstable cross-linked network in the gel particles to break, the chemical cross-linked density in the particles is reduced, and the particles absorb water again to swell, so that the channeling path is plugged. Such gel particles have secondary swelling characteristics, but have the problems of limited swelling multiple and significantly reduced strength after swelling.

SUMMARY

In view of this, to solve the technical problems in the prior art that the conventional gel particles are short in swelling time and easy to dehydrate under in a CO2 atmosphere, and CO2 responsive gel particles are limited in secondary swelling multiple and reduced in strength after swelling, the present invention provides a CO2 responsive core-shell multi-stage swelling microsphere and a preparation method thereof.

The preparation method of a CO2 responsive core-shell multi-stage swelling microsphere disclosed by the present invention comprises the following steps:

step S1: adding a styrene monomer into a solution of sodium dodecyl sulfate in deionized water, stirring at the speed of 300-700 RPM for 20-30 min, adding an initiator, continuously stirring for 20-30 min, and then performing emulsion polymerization at 30-50° C. for 2-3 h to obtain a spherical polystyrene solution for later use;

step S2: taking azobisisobutyronitrile and ethylene glycol as raw materials for Pinner reaction, separating and purifying to obtain an azo compound with hydroxyl functional groups at two ends, taking the azo compound with the hydroxyl functional groups at two ends obtained by the reaction as a raw material, performing Schotten-Baumann reaction with methacryloyl chloride, and separating and purifying to obtain a compound BPAB with a double-bond functional group at an end group;

wherein a generation route of the compound BPAB with the double-bond functional group at the end group is shown in FIG. 1, and the specific preparation method can be referred to a preparation method of a compound with a double-bond functional group at an end group in the New Method for Preparation of Nanospherical Polyelectrolyte Brush-Thermally Controlled Emulsion polymerization (Xu Jun, Wang Xiang, Wu Shuang, et al.);

step S3: preparing a solution of BPAB in acetone, slowly dripping the solution of BPAB in acetone into the spherical polystyrene solution at 0-5° C., heating to room temperature after dripping is completed, and filtering out agglomerated particles to obtain an active polystyrene core solution; and step S4: adding the active polystyrene core solution, acrylamide, a CO2 responsive monomer, a CO2 responsive cross-linking agent and a stable cross-linking agent into deionized water to form a reaction solution, wherein a mass fraction of the active polystyrene core solution is 5-10%, a mass fraction of the acrylamide is 10-20%, a mass fraction of the CO2 responsive monomer is 1-5%, a mass fraction of the CO2 responsive cross-linking agent is 0.1-0.2%, and a mass fraction of the stable cross-linking agent is 0.1-0.2%, introducing nitrogen into the reaction solution to remove oxygen for 30 min, heating to 30-70° C., and reacting for 3-5 h to obtain the CO2 responsive core-shell multi-stage swelling microsphere solution, wherein the entire reaction flow of the steps S1-S4 is shown in FIG. 2.

According to one embodiment of the present invention, in the solution of sodium dodecyl sulfate in deionized water in step S1, a mass fraction of the sodium dodecyl sulfate is 0.5-3%, a mass fraction of the added styrene monomer is 3-8%, and a mass fraction of the added initiator is 0.1-0.4%.

According to one embodiment of the present invention, a mass ratio of the azobisisobutyronitrile to the ethylene glycol in the Pinner reaction is 1-2:1.

According to one embodiment of the present invention, a mass ratio of the azo compound with the hydroxyl functional groups at two ends to the methacryloyl chloride in the Schotten-Baumann reaction is 1-2:1.

According to one embodiment of the present invention, a mass fraction of the BPAB in the solution of BPAB in acetone in the step S3 is 10-20%, and a mass ratio of the BPAB to the styrene is 1:5-10.

According to one embodiment of the present invention, the CO2 responsive monomer is one or a combination of dimethylaminoethyl acrylate, N-[3(dimethylamino)propyl]-2-methyl-2-acrylamide, and N-(3-(dimethylamino)propyl methacrylamide).

According to one embodiment of the present invention, the CO2 responsive cross-linking agent is N,N'-diacryloyloxy-bis(2-aminoethoxy)methane.

According to one embodiment of the present invention, the stable cross-linking agent is N,N-methylenebisacrylamide.

According to one embodiment of the present invention, the initiator in the step S1 is one or a combination of a persulfate/bisulfite system in a mass ratio of 1:1, azobis (isobutylamine hydrochloride), and persulfate.

Further, the present invention provides a CO2 responsive core-shell multi-stage swelling microsphere prepared by any one of the above embodiments, an initial particle size of the microsphere is 1-20 μm, and a particle size of the microsphere after expansion is 3-30 μm.

The present invention has the technical effects as follows.

(1) The CO2 responsive core-shell multi-stage swelling microsphere of the present invention has three-stage swelling characteristics. When the microsphere is injected into water, the microsphere is subjected to primary swelling, and a particle size of the microsphere increases by 5 μm to 10 μm; after the microsphere contacts CO2, a CO2 responsive monomer is subjected to a protonation reaction, the hydrophilicity of the microsphere is enhanced, the microsphere is subjected to two water absorption expansions, and the particle size of the microsphere is increased by 2 μm to 7 μm; the CO2 is dissolved in formation water to form carbonated water, the carbonated water induces the acid-sensitive cross-linking agent in the microsphere to lose efficacy, the cross-linking network density in the microsphere is reduced, the microsphere is subjected to three water absorption expansions, and the particle size of the microsphere is increased by 2 μm to 7 μm. The size of the microsphere increases after contacting CO2, and the CO2 channeling path is plugged in the single capture or multi-bridging form, which can significantly improve the CO2 flooding sweep efficiency.

(2) The microsphere has the characteristics of no expansion when encountering crude oil and only one expansion in formation water, shows the property of plugging CO2 but not plugging oil, and thus has important practical significance for achieving CO2 selective channeling prevention.

(3) The size of the polystyrene core can be adjusted by adjusting the concentration and the proportion of the sodium dodecyl sulfate and the styrene, and the initial particle size of the microsphere can be adjusted by adjusting the proportion and the concentration of the acrylamide and the active styrene. The styrene does not expand when absorbing water and has higher strength, so that the microspheres after three swellings can still maintain higher strength.

(4) The microsphere injection allocation process is simple, the microspheres can be quickly dispersed into injection water, and an additional injection allocation device is not required, so that the construction cost is low.

DESCRIPTION OF EMBODIMENTS

The present invention is further described in detail below with reference to the examples; however, the examples of the present invention are not limited thereto. Unless otherwise stated, the experimental methods used in the following examples are conventional methods. The materials, reagents, and the like used in the following examples can be commercially available unless otherwise stated.

In the present invention, the Pinner reaction refers to the formation of hydrochloride of imidoester by nitrile and alcohol under the catalysis of acid (such as hydrochloric acid); and the Schotten-Baumann reaction refers to the synthesis of amide by amine and acyl halide or acid anhydride in the presence of base, and the synthesis of ester by alcohol and acyl halide or acid anhydride.

Example 1

(1) 2.0 g of sodium dodecyl sulfate and 10.0 g of styrene were added into 200 mL of deionized water, the reaction solution was stirred for 30 min in the nitrogen atmosphere at the stirring speed of 700 RPM, then 0.6 g of ammonium persulfate was added, and the reaction solution was stirred for 30 min, then heated to 50° C. and reacted for 2 h to prepare a polystyrene (PS) core microsphere solution.

(2) 10 mL of ethylene glycol was placed in a stirred reaction bottle, the temperature was reduced to 0° C. by using an ice-water bath, 16.4 g of azobisisobutyronitrile was added, the dry HCl was introduced through a conduit under the stirring condition, after the reaction solution was reacted for 12 h, filtration was performed under vacuum to obtain a white precipitate, and the precipitate was washed by using n-hexane and dried to obtain an azo compound with hydroxyl functional groups at two ends.

Figure 1:
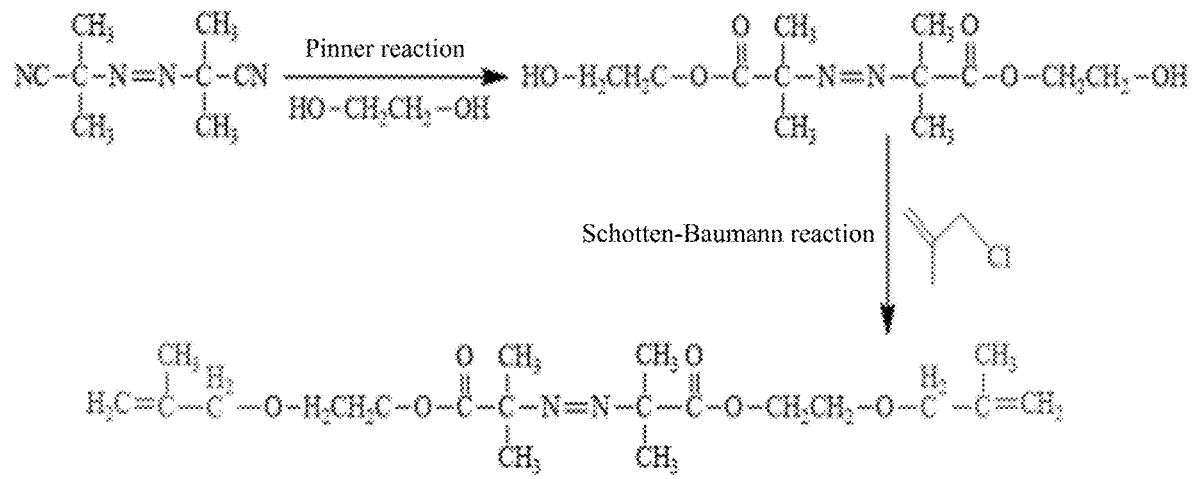
FIG. 1 is a reaction flow chart for preparing BPAB according to the present invention.

(3) 10 g of the azo compound with the hydroxyl functional groups at two ends was added into a single-neck flask, 70 mL of acetone was added, 4 mL of triethylamine was added after stirring and dissolving, and then the temperature was reduced to 0° C. to 5° C. 7 mL of methacryloyl chloride dissolved in 30 mL of acetone was added to the above solution at a rate of 6 to 10 drops per second under the stirring condition. After the addition was completed, stirring was continued for 30 min, and then the temperature was raised to room temperature for 12 h. A solid phase in the solution was removed by suction filtration under reduced pressure, and the acetone was removed by rotary evaporation under reduced pressure to obtain the double-bond functional group BPAB, wherein the specific reaction process of this step is shown in FIG. 1.

(4) 1.0 g of the BPAB prepared in the step (3) was dissolved in 7.0 g of acetone, the reaction solution was filled into a constant-pressure funnel, which was slowly dropwise added into the polystyrene (PS) core microsphere solution prepared in the step (1) at a speed of 5 seconds per drop under the stirring condition, the temperature of the solution was cooled to room temperature after the dropwise adding was completed, and glass wool was filtered to remove agglomerated particles to obtain an active polystyrene core microsphere solution.

Figure 2:
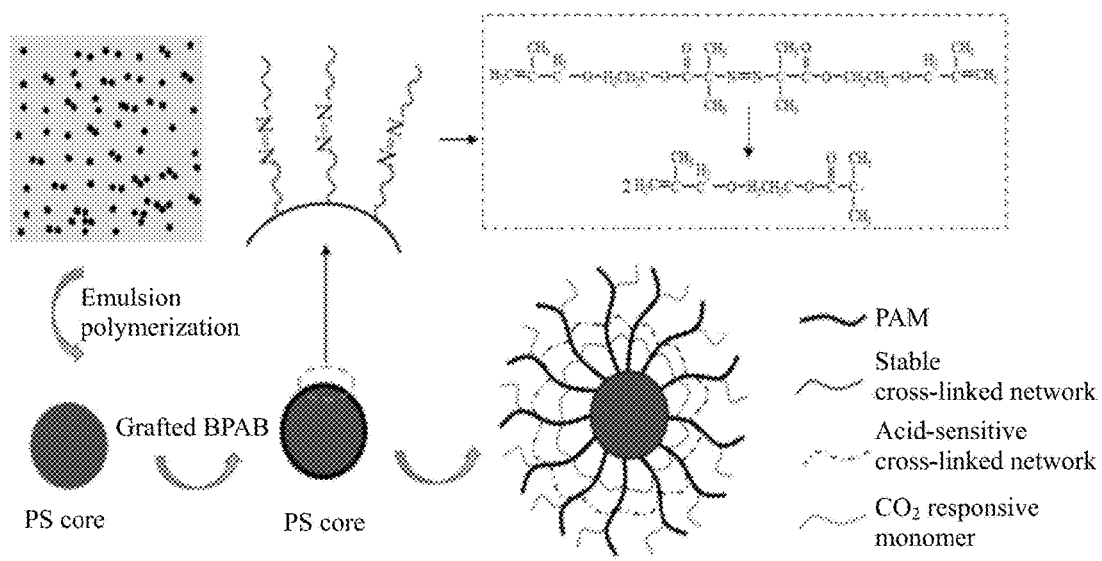
FIG. 2 is a synthetic route for preparing an active polystyrene core according to the present invention.

(5) 10 g of acrylamide (AM), 2 g of dimethylaminoethyl acrylate as a $CO_2$ responsive monomer, 0.1 g N,N-methylenebisacrylamide as a stable cross-linking agent, 0.1 g of N,N'-diacryloyloxy-bis(2-aminoethoxy)methane as a $CO_2$ responsive cross-linking agent and 50 g of deionized water were added into a 100 mL beaker and completely dissolved, then 4 g of the active polystyrene core microsphere solution prepared in the step (4) was added into the solution, nitrogen was introduced for 30 min to remove oxygen in the solution, the reaction solution was heated to 45° C. and reacted for 3 h to obtain a $CO_2$ responsive core-shell multi-stage swelling microsphere solution, and the entire reaction flow shown in FIG. 2 was completed.

Example 2

The implementation of this example is basically the same as that of Example 1, except that the mass of the sodium dodecyl sulfate in step (1) is 3.0 g.

Example 3

The implementation of this example is basically the same as that of Example 1, except that the $CO_2$ responsive monomer in the step (5) is N-[3(dimethylamino)propyl]-2-methyl-2-acrylamide.

Example 4

The implementation of this example is basically the same as that of Example 1, except that the mass of the dimethylaminoethyl acrylate in the step (5) is 1 g.

Example 5

The implementation of this example is basically the same as that of Example 1, except that the addition amount of the active polystyrene core microsphere solution prepared in the step (5) is 6 g.

Comparative Example 1

The implementation of this comparative example is basically the same as that of Example 1, except that no $CO_2$ responsive cross-linking agent N,N'-diacryloyloxy-bis(2-aminoethoxy)methane is added in the step (5).

Comparative Example 2

The implementation of this comparative example is basically the same as that of Example 1, except that no $CO_2$ responsive monomer dimethylaminoethyl acrylate is added in the step (5).

Comparative Example 3

The implementation of this comparative example is basically the same as that of Example 1, except that 4 g of azobis(isobutylamine hydrochloride) was used in the step (5) to replace the activated polystyrene core microsphere to perform the step (5), and the resulting particles were pulverized and granulated to give a product having a particle size equivalent to that of the final product in Example 1.

To better illustrate the technical effects of the present invention, performance evaluations are provided below for related examples or comparative examples.

I. Evaluation of Microsphere Swelling Performance

Multiple swelling experiments were performed on a NaCl solution with a mineralization of water of 20000 mg/L at 50° C. The median particle size of the $CO_2$ responsive core-shell multi-stage swelling microsphere obtained in Examples and Comparative Examples 1 and 2 after three swellings was tested by using a laser particle size analyzer. The results are shown in Table 1.

TABLE 1

Median particle size distribution of microspheres after swelling at stages

| Microsphere No. | Initial state (μm) | After one swelling equilibrium (48 h, μm) | 24 h after contacting $CO_2$ (μm) | 48 h after contacting $CO_2$ (μm) |
|---|---|---|---|---|
| Example 1 | 17.8 | 24.7 | 27.9 | 31.2 |
| Example 2 | 14.3 | 20.1 | 23.2 | 26.3 |
| Example 3 | 17.3 | 23.8 | 27.2 | 30.6 |
| Example 4 | 17.6 | 24.4 | 26.7 | 29.2 |
| Example 5 | 9.2 | 14.3 | 16.7 | 19.5 |
| Comparative Example 1 | 17.7 | 24.5 | 26.8 | 26.8 |
| Comparative Example 2 | 18.2 | 25.2 | 26.5 | 26.5 |

Table 1 shows the change of the median particle size change of $CO_2$ responsive core-shell multi-stage swelling microspheres in Examples and Comparative Examples after three swellings. It was found by comparison that the microsphere in Example 1 expanded three times. The particle size of the microsphere increased by 6.9 μm after the first expansion, 3.2 μm after the second expansion, and 3.3 μm after the third expansion, with a total increase of 13.4 μm; and the microspheres in Examples 2 to 5 were all subjected to multi-stage swelling, and the particle size increase between the initial state and the final state was greater than 10 μm. In contrast, microspheres in Comparative Examples, to which no $CO_2$ responsive cross-linking agent or $CO_2$ responsive monomer was added, only expanded twice, and the particle sizes increased by 9.1 μm and 8.3 μm, respectively. Therefore, the $CO_2$ responsive core-shell multi-stage swelling microsphere has a larger responsive expansion multiple to $CO_2$, stronger selective plugging capability and longer expansion time, which is conducive to entering deep into the reservoir for plugging.

II. Evaluation of Microsphere Swelling Strength

The swelling strength of the microsphere was tested by using a steering pressure method, and the test conditions were as follows: the experiment was performed in the NaCl solution with a mineralization of water of 20000 mg/L using a modified TGU apparatus at an experimental temperature of 50° C. The experimental steps were as follows: 1) preparing a polymer solution with a concentration of 5000 mg/L (the polymer was KYPAM with a molecular weight of 10 million) and a polymer+5000 mg/L microsphere system with a concentration of 5000 mg/L, sealing and then placing in an oven at 50° C.; 2) installing a steering pressure testing device, wherein adjacent screens are staggered by 45°; 3) adding the prepared polymer base liquid into an intermediate container, and adjusting the pressure to 20 kPa through a pressure reducing valve; 4) opening an outlet, starting timing when the outlet begun to discharge liquid, and recording the liquid volume after 5 min; 5) adjusting the pressure reducing valve, increasing the pressure to 60 kPa, 100 kPa, 150 kPa and 200 kPa, and testing the liquid discharge volume for 5 min under different pressures; 6) taking out the screens, cleaning, mounting the screens again, adding the polymer and microsphere mixed system into the intermediate container, and repeating the experiment steps 2)-5); and 7) according to a relationship between the TGU value and the flow of the system under different pressures, obtaining the microsphere steering pressure. The specific results are shown in Table 2.

TABLE 2

Swelling strength distribution of microspheres at stages

| Microsphere No. | Initial state (kPa) | After one swelling equilibrium (48 h, kPa) | 24 h after contacting $CO_2$ (kPa) | 48 h after contacting $CO_2$ (kPa) |
|---|---|---|---|---|
| Example 1 | 98.7 | 103.5 | 107.8 | 112.2 |
| Example 2 | 89.4 | 100.3 | 102.5 | 105.3 |
| Example 3 | 96.8 | 102.1 | 105.4 | 110.7 |
| Example 4 | 97.2 | 102.6 | 104.9 | 107.8 |
| Example 5 | 78.4 | 88.7 | 96.6 | 103.8 |
| Comparative Example 3 | 97.4 | 102.4 | 104.3 | 103.2 |

Table 2 shows the strength changes of the CO2 responsive core-shell multi-stage swelling microspheres in Examples and Comparative Example 3 as well as the microsphere in Comparative Example 3 at different swelling stages. It can be found that the multi-stage swelling microsphere system with polystyrene core microspheres has polystyrene with higher strength, so that the multi-stage swelling microsphere system still can maintain higher strength under the condition of larger multiple, while the microspheres in Comparative Examples are subjected to three-stage swelling after contacting CO2, so that the cross-linking network density is reduced, and the strength is reduced.

III. Evaluation of Displacement Effect

The CO2 responsive core-shell multi-stage swelling microspheres in Examples were used for a core displacement experiment to test the plugging effect of the microspheres on the core, wherein the core used in the experiment has a length of 8.0 cm, a diameter of 3.8 cm, a matrix permeability of 1.2 mD and a fracture width of 0.2 mm, the microspheres used in the experiment are microsphere solution obtained by one swelling, the concentration of the microsphere solution is 5000 mg/L,%, the injection volume is 1 PV, and 0.5 PV microspheres and 0.5 PV CO2 are alternately injected 2 times at the injection speed of 0.5 mL/min. The experimental results are shown in FIGS. 3-7.

Figure 3:
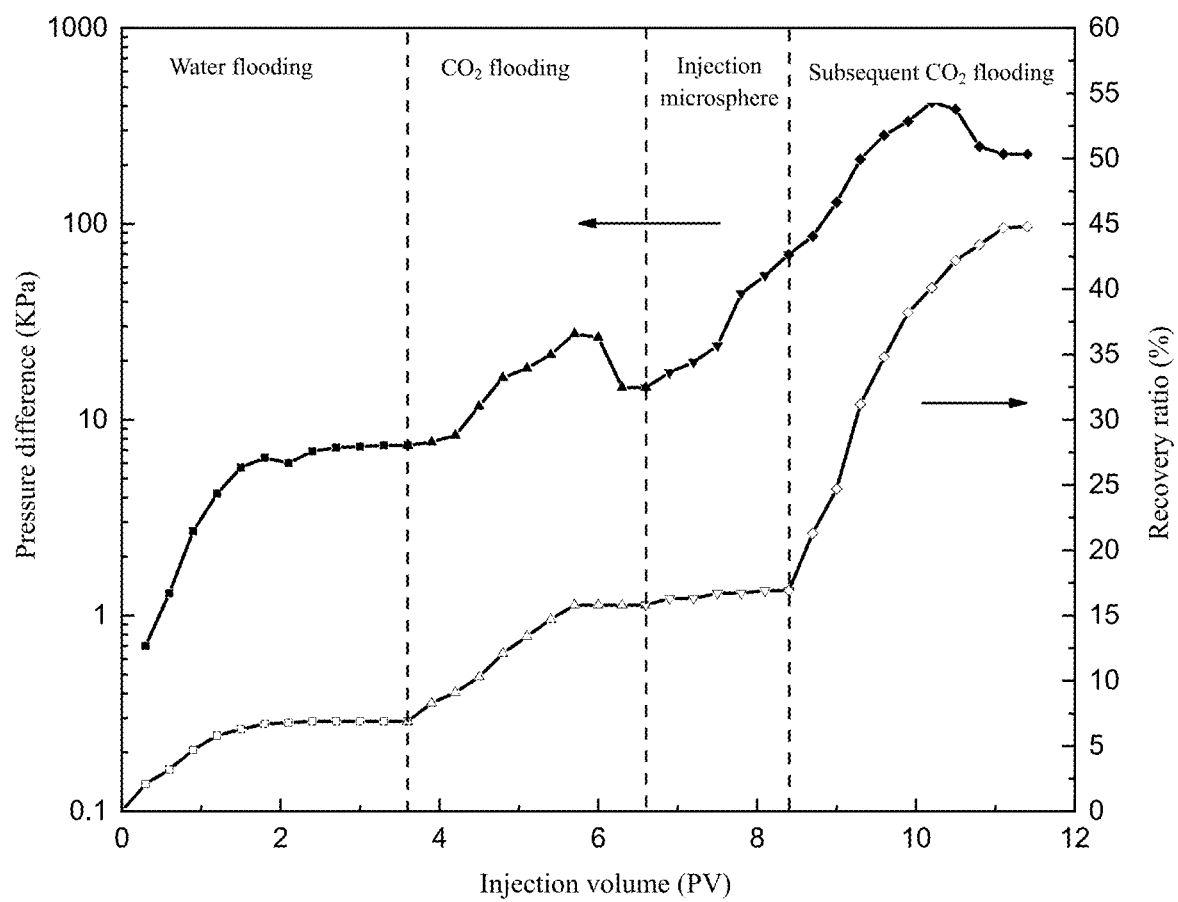
FIG. 3 is a diagram of results of a displacement experiment in Example 1 according to the present invention.

FIG. 3 shows the effect of improving CO2 flooding recovery ratio of the CO2 responsive core-shell multi-stage swelling microsphere in Example 1 according to the present invention. The first stage is water flooding, which mainly displaces the core in the fracture. The recovery ratio in this case is 6.9% and the stable displacement pressure difference is 7.4 kPa. The second stage is CO2 flooding, which mainly displaces the crude oil in the matrix adjacent to the fracture, the recovery ratio is improved by 8.9%, and the stable pressure difference after CO2 channeling is 14.6 kPa. The third stage is the alternate injection of microspheres and CO2. In this case, the microspheres enter the fracture, and almost no crude oil is produced, but the injection pressure difference increases. After soaking was performed for 48 h, CO2 displacement was performed again, the microspheres were fully swelled in this case, the channeling path was effectively plugged, and the maximum displacement pressure difference increased to 418.7 kPa. After CO2 breakthrough, the displacement pressure difference was stable at 222 kPa, indicating that the microspheres remained in the fracture to improve fracture permeability. The recovery ratio increased by 29% by CO2 flooding after microsphere plugging.

Figure 4:
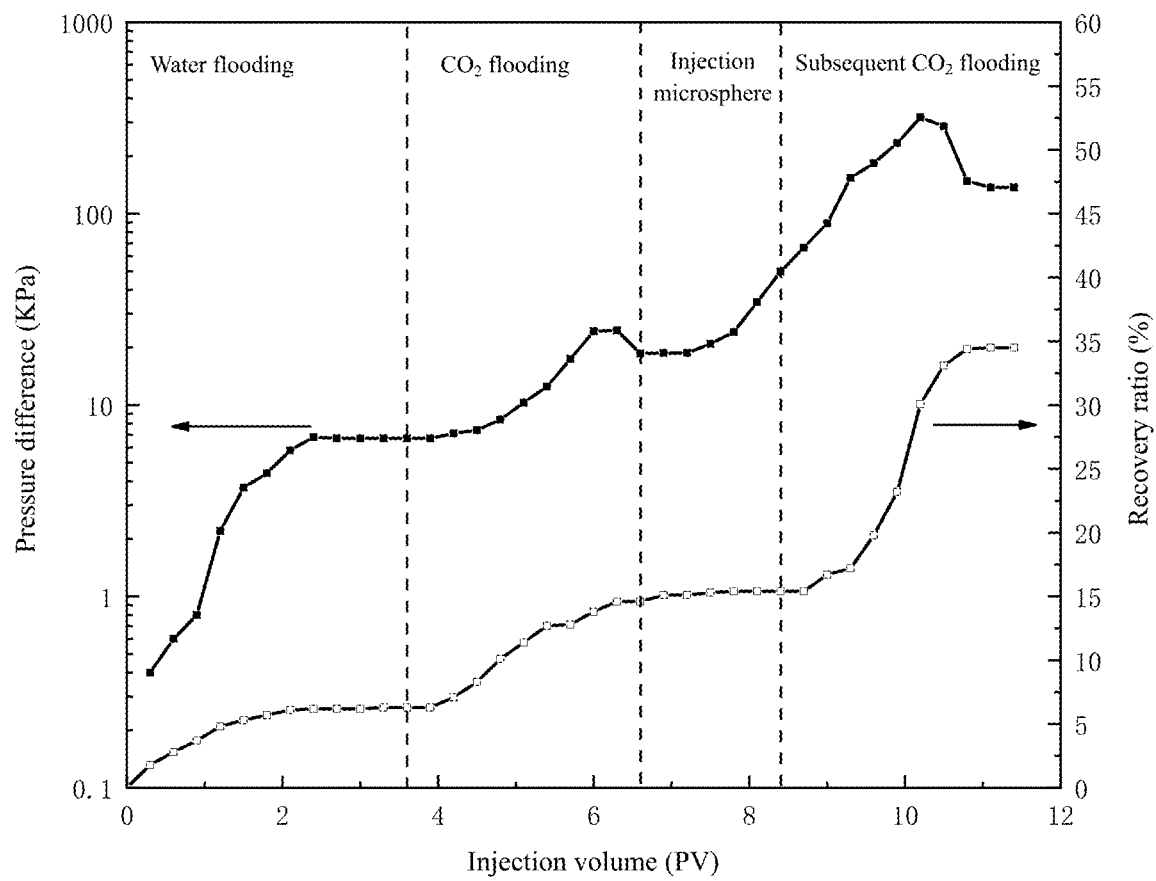
FIG. 4 is a diagram of results of a displacement experiment in Example 2 according to the present invention.

FIG. 4 shows the effect of improving CO2 flooding recovery ratio of the CO2 responsive core-shell multi-stage swelling microsphere in Example 2 according to the present invention. The core used in the experiment has a length of 7.8 cm, a diameter of 3.8 cm, a matrix permeability of 1.3 mD and a fracture width of 0.2 mm, the microspheres used in the experiment are microsphere solution obtained by one swelling, the concentration of the microsphere solution is 0.5%. The first stage is water flooding, which mainly displaces the core in the fracture. The recovery ratio in this case is 6.3% and the stable displacement pressure difference is 6.7 kPa. The second stage is CO2 flooding, which mainly displaces the crude oil in the matrix adjacent to the fracture, the recovery ratio is improved by 8.3%, and the stable pressure difference after CO2 channeling is 18.6 kPa. The third stage is the alternate injection of microspheres and CO2. The microspheres enter the fracture, and almost no crude oil is produced, but the injection pressure difference increases. After soaking was performed for 48 h, CO2 displacement was performed again, the microspheres were fully swelled in this case, the channeling path was effectively plugged, and the maximum displacement pressure difference increased to 318.9 kPa. After CO2 breakthrough, the displacement pressure difference was stable at 137 kPa, indicating that the microspheres plugged the channeling path in the fracture, and the recovery ratio improved by 19.9% by CO2 flooding after microsphere plugging.

Figure 5:
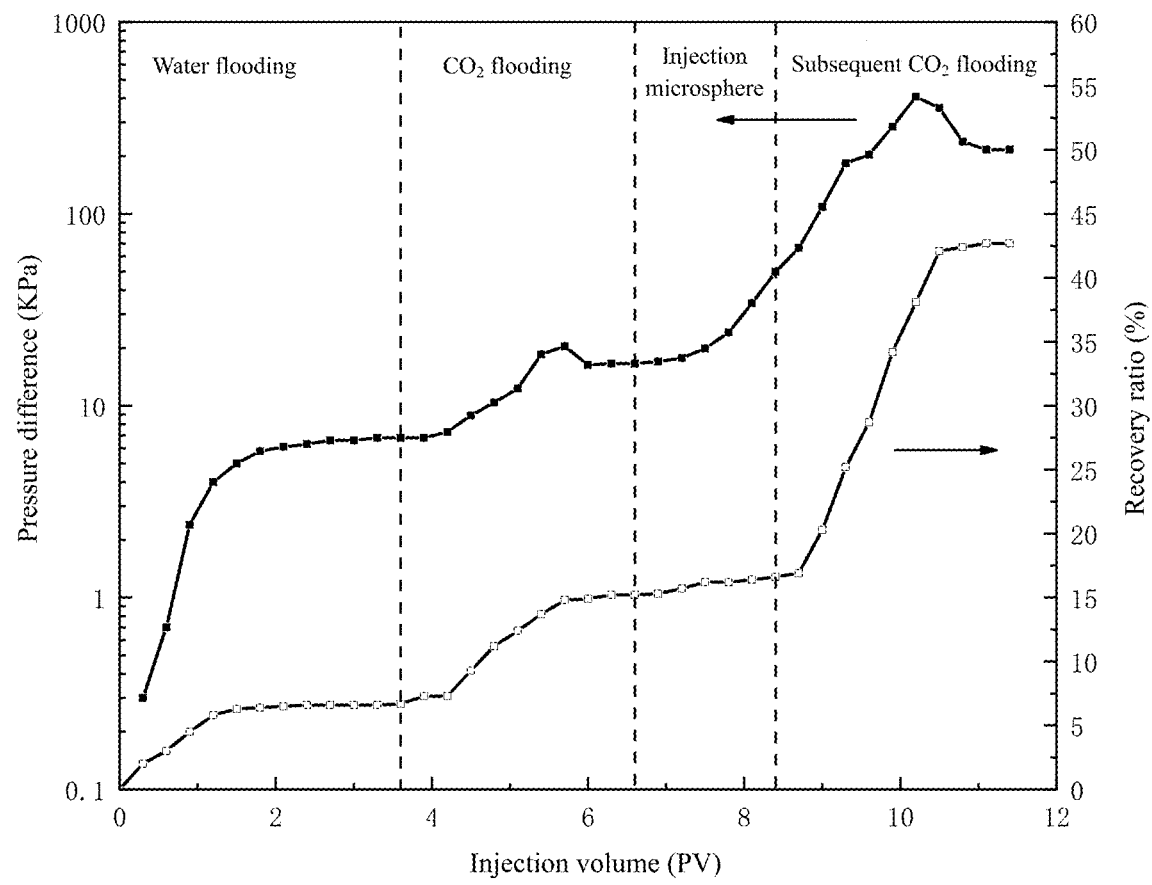
FIG. 5 is a diagram of results of a displacement experiment in Example 3 according to the present invention.

FIG. 5 shows the effect of improving CO2 flooding recovery ratio of the CO2 responsive core-shell multi-stage swelling microsphere in Example 3 according to the present invention. The core used in the experiment has a length of 7.9 cm, a diameter of 3.8 cm, a matrix permeability of 1.2 mD and a fracture width of 0.2 mm, the microspheres used in the experiment are microsphere solution obtained by one swelling, the concentration of the microsphere solution is 0.5%. The first stage is water flooding, which mainly displaces the core in the fracture. The recovery ratio in this case is 6.7% and the stable displacement pressure difference is 6.8 kPa. The second stage is CO2 flooding, which mainly displaces the crude oil in the matrix adjacent to the fracture, the recovery ratio is improved by 8.5%, and the stable pressure difference after CO2 channeling is 16.6 kPa. The third stage is the alternate injection of microspheres and CO2. The microspheres enter the fracture, and almost no crude oil is produced, but the injection pressure difference increases. After soaking was performed for 48 h, CO2 displacement was performed again, the microspheres were fully swelled in this case, the channeling path was effectively plugged, and the maximum displacement pressure difference increased to 408.7 kPa. After CO2 breakthrough, the displacement pressure difference was stable at 216 kPa, indicating that the microspheres plugged the channeling path in the fracture, and the recovery ratio improved by 27.5% by CO2 flooding after microsphere plugging.

Figure 6:
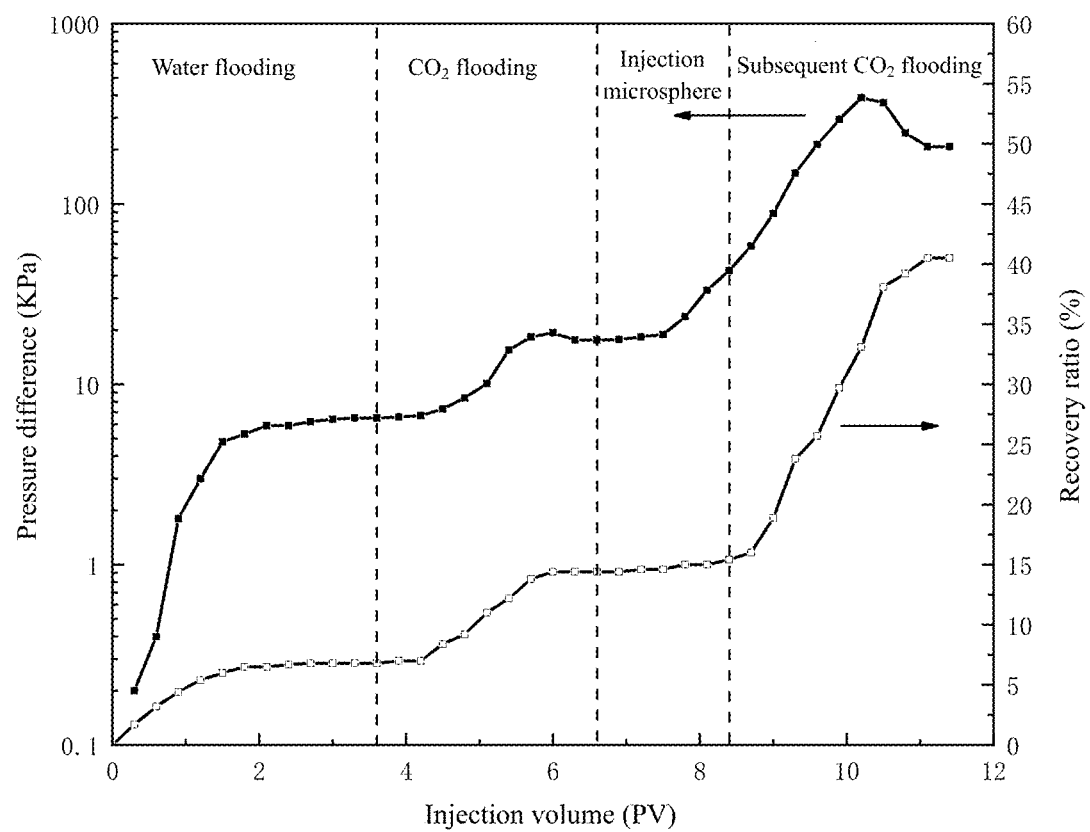
FIG. 6 is a diagram of results of a displacement experiment in Example 4 according to the present invention.

FIG. 6 shows the effect of improving CO2 flooding recovery ratio of the CO2 responsive core-shell multi-stage swelling microsphere in Example 4 according to the present invention. The core used in the experiment has a length of 7.9 cm, a diameter of 3.8 cm, a matrix permeability of 1.3 mD and a fracture width of 0.2 mm, the microspheres used in the experiment are microsphere solution obtained by one swelling, the concentration of the microsphere solution is 0.5%. The first stage is water flooding, which mainly displaces the core in the fracture. The recovery ratio in this case is 6.8% and the stable displacement pressure difference is 6.5 kPa. The second stage is CO2 flooding, which mainly displaces the crude oil in the matrix adjacent to the fracture, the recovery ratio is improved by 7.6%, and the stable pressure difference after CO2 channeling is 17.6 kPa. The third stage is the alternate injection of microspheres and CO2. The microspheres enter the fracture, and almost no crude oil is produced, but the injection pressure difference increases. After soaking was performed for 48 h, CO2 displacement was performed again, the microspheres were fully swelled in this case, the channeling path was effectively plugged, and the maximum displacement pressure difference increased to 387.8 kPa. After CO2 breakthrough, the displacement pressure difference was stable at 207.4 kPa, indicating that the microspheres plugged the channeling path in the fracture, and the recovery ratio improved by 26.1% by CO2 flooding after microsphere plugging.

Figure 7:
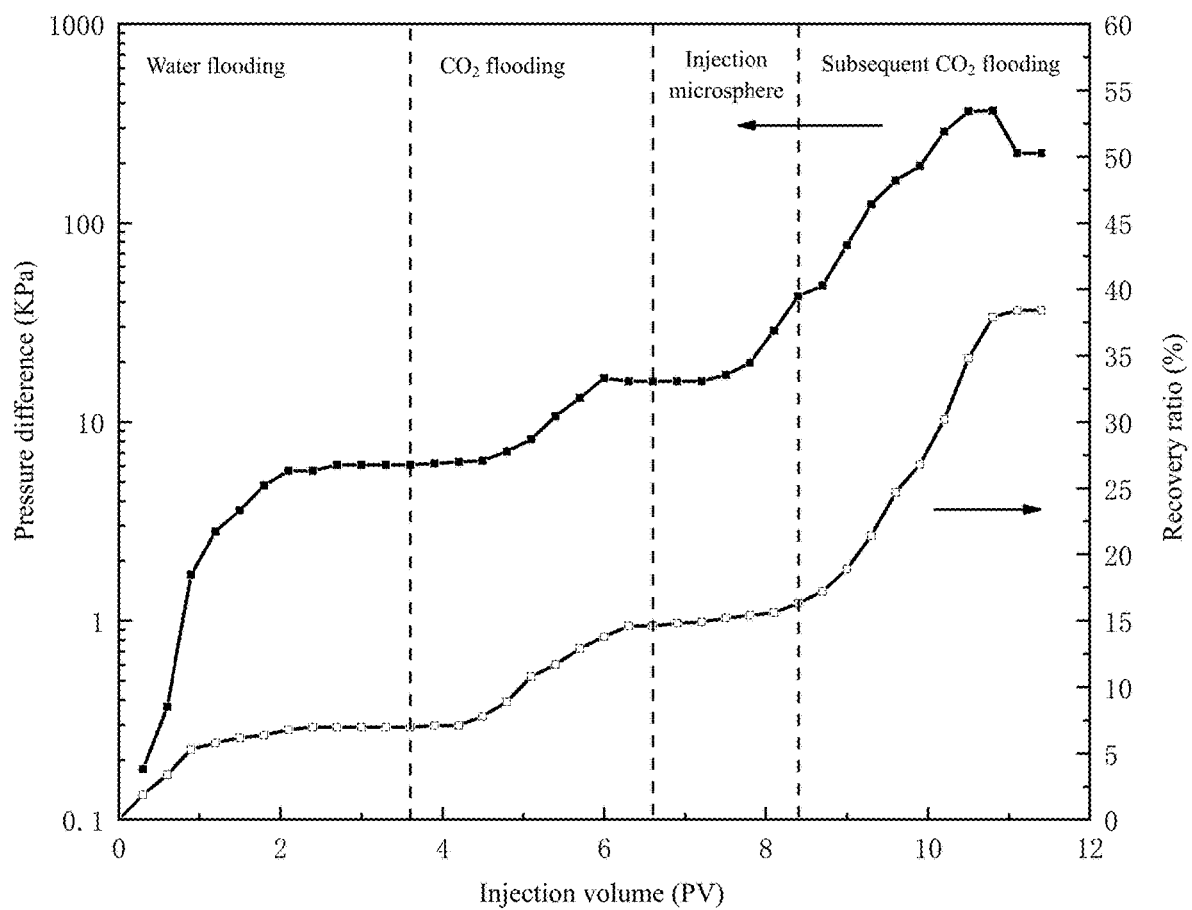
FIG. 7 is a diagram of results of a displacement experiment in Example 5 according to the present invention.

FIG. 7 shows the effect of improving CO2 flooding recovery ratio of the CO2 responsive core-shell multi-stage swelling microsphere in Example 5 according to the present invention. The core used in the experiment has a length of 8.0 cm, a diameter of 3.8 cm, a matrix permeability of 1.0 mD and a fracture width of 0.2 mm, the microspheres used in the experiment are microsphere solution obtained by one swelling, the concentration of the microsphere solution is 0.5%. The first stage is water flooding, which mainly displaces the core in the fracture. The recovery ratio in this case is 7.0% and the stable displacement pressure difference is 6.1 kPa. The second stage is CO2 flooding, which mainly displaces the crude oil in the matrix adjacent to the fracture, the recovery ratio is improved by 7.6%, and the stable pressure difference after CO2 channeling is 16.0 kPa. The third stage is the alternate injection of microspheres and CO2. The microspheres enter the fracture, and almost no crude oil is produced, but the injection pressure difference increases. After soaking was performed for 48 h, CO2 displacement was performed again, the microspheres were fully swelled in this case, the channeling path was effectively plugged, and the maximum displacement pressure difference increased to 367.1 kPa. After CO2 breakthrough, the displacement pressure difference was stable at 224.7 kPa, indicating that the microspheres plugged the channeling path in the fracture, and the recovery ratio improved by 23.8% by CO2 flooding after microsphere plugging. Compared with Examples 1-4, the particle size of the microsphere in Example 5 is significantly reduced, but at the same concentration, the microsphere still maintains a relatively high strength after expansion, and thus can plug the channeling path by bridging.

In conclusion, the CO2 responsive core-shell multi-stage swelling microsphere provided by the present invention can achieve multi-stage swelling of the microsphere by introducing the CO2 responsive monomer and the CO2 responsive cross-linking agent, so that the microsphere slowly expands to the maximum in a CO2 channeling path, the expanded microsphere plugs the pore throat of the channeling path, CO2 is forced to turn, and a displacement medium enters the low-permeability area not swept by the CO2 flooding, thereby achieving the purposes of increasing the swept efficiency and improving the recovery ratio.

The above descriptions are merely preferred specific embodiments of the present invention, however, the protection scope of the present invention is not limited thereto, and any modifications and substitutions that can be easily conceived by those skilled in the art within the technical scope disclosed by examples of the present invention shall fall within the protection scope of the present invention. Therefore, the protection scope of the present invention shall be subject to the protection scope of the claims.

What is claimed is:

1. A preparation method of a $CO_2$ responsive core-shell multi-stage swelling microsphere, comprising the following steps:
    step S1: adding a styrene monomer into a solution of sodium dodecyl sulfate in deionized water, stirring at the speed of 300-700 RPM for 20-30 min, adding an initiator, continuously stirring for 20-30 min, and then performing emulsion polymerization at 30-50° C. for 2-3 h to obtain a spherical polystyrene solution for later use; wherein in the solution of sodium dodecyl sulfate in deionized water, a mass fraction of the sodium dodecyl sulfate is 0.5-3%, a mass fraction of the added styrene monomer is 3-8%, and a mass fraction of the added initiator is 0.1-0.4%;
    step S2: taking azobisisobutyronitrile and ethylene glycol as raw materials for Pinner reaction, preparing an azo compound with hydroxyl functional groups at two ends, taking the azo compound with the hydroxyl functional groups at two ends obtained by the reaction as a raw material, performing Schotten-Baumann reaction with methacryloyl chloride, and preparing a compound BPAB with a double-bond functional group at an end group; wherein a mass ratio of the azodiisobutyronitrile to the ethylene glycol in the Pinner reaction is 1-2:1, and a mass ratio of the azo compound with the hydroxyl functional groups at two ends to the methacryloyl chloride in the Schotten-Baumann reaction is 1-2:1;
    step S3: preparing a solution of BPAB in acetone, slowly dripping the solution of BPAB in acetone into the spherical polystyrene solution at 0-5° C., heating to room temperature after dripping is completed, and filtering out agglomerated particles to obtain an active polystyrene core solution; wherein a mass fraction of the BPAB in the solution of BPAB in acetone is 10-20%, and a mass ratio of the BPAB to the styrene is 1:5-10; and
    step S4: adding the active polystyrene core solution, acrylamide, a $CO_2$ responsive monomer, a $CO_2$ responsive cross-linking agent and a stable cross-linking agent into deionized water to form a reaction solution, wherein a mass fraction of the active polystyrene core solution is 5-10%, a mass fraction of the acrylamide is 10-20%, a mass fraction of the $CO_2$ responsive monomer is 1-5%, a mass fraction of the $CO_2$ responsive cross-linking agent is 0.1-0.2%, and a mass fraction of the stable cross-linking agent is 0.1-0.2%, introducing nitrogen into the reaction solution to remove oxygen for 30 min, heating to 30-70° C., and reacting for 3-5 h to obtain the $CO_2$ responsive core-shell multi-stage swelling microsphere.

2. The preparation method of the $CO_2$ responsive core-shell multi-stage swelling microsphere according to claim 1, wherein the $CO_2$ responsive monomer is one or a combination of dimethylaminoethyl acrylate, N-[3(dimethylamino)propyl]-2-methyl-2-acrylamide, and N-(3-(dimethylamino)propyl methacrylamide).

3. The preparation method of the $CO_2$ responsive core-shell multi-stage swelling microsphere according to claim 1, wherein the $CO_2$ responsive cross-linking agent is N,N-diacryloyloxy-bis(2-aminoethoxy)methane.

4. The preparation method of the $CO_2$ responsive core-shell multi-stage swelling microsphere according to claim 1, wherein the stable cross-linking agent is N,N-methylenebisacrylamide.

5. The preparation method of the $CO_2$ responsive core-shell multi-stage swelling microsphere according to claim 1, wherein the initiator in the step S1 is one or a combination of a persulfate/bisulfite system in a mass ratio of 1:1, azobis(isobutylamine hydrochloride), and persulfate.

* * * * *